Figure 1:
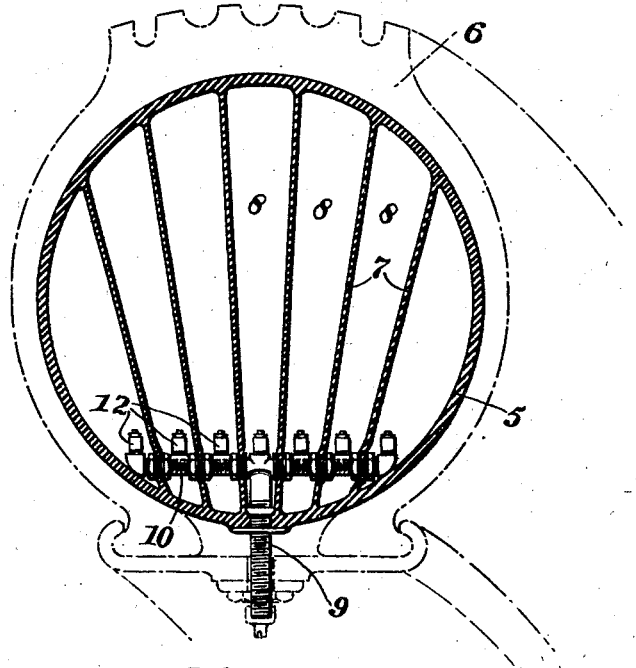

April 20, 1948.    N. R. MADDOX    2,440,107

SAFETY INNER TUBE FOR PNEUMATIC TIRES

Filed July 6, 1945    2 Sheets-Sheet 1

Inventor:

*Norval Robert Maddox,*

By *Clarence A. O'Brien
and Harvey B. Jacobson*
Attorneys

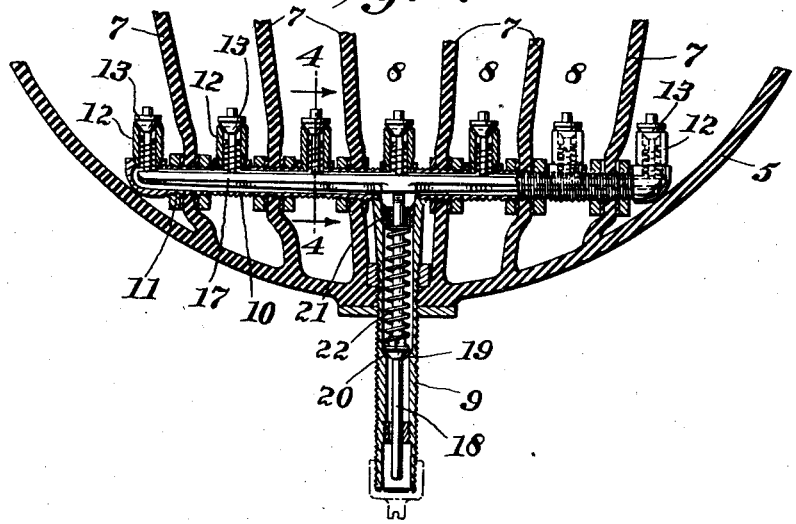
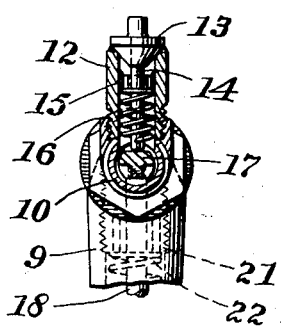
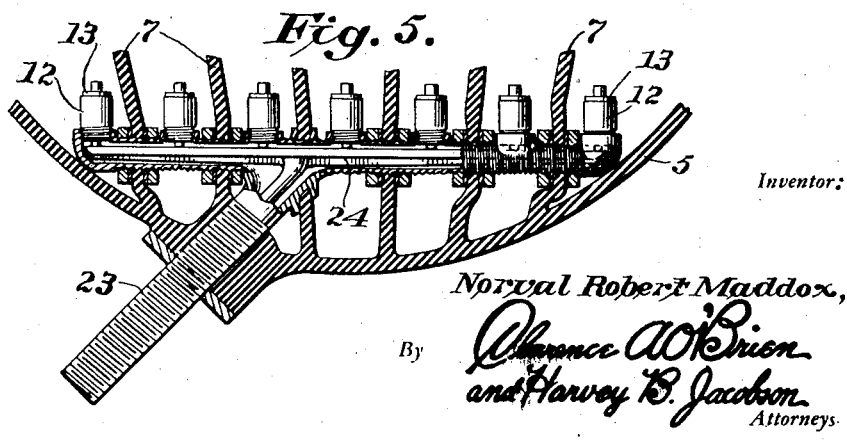

Patented Apr. 20, 1948

2,440,107

UNITED STATES PATENT OFFICE 2,440,107

SAFETY INNER TUBE FOR PNEUMATIC TIRES

Norval Robert Maddox, Owingsville, Ky.

Application July 6, 1945, Serial No. 603,430

2 Claims. (Cl. 152—342)

The present invention relates to new and useful improvements in pneumatic tires, and more particularly to a safety inner tube of a type which is constructed of a plurality of flexible partitions defining annular compartments, each of which is independent and separately inflated so that in the event one compartment should be punctured, the rest will be unaffected and the form or riding qualities of the tire will be undisturbed.

An important object of the present invention is to provide an air valve for an inner tube of this character whereby the several compartments may be uniformly inflated.

Another object of the invention is to provide a device of this character of simple and practical construction, which is efficient and reliable in use, relatively inexpensive to manufacture, and otherwise well adapted for the purposes for which the same is intended.

Figure 2:
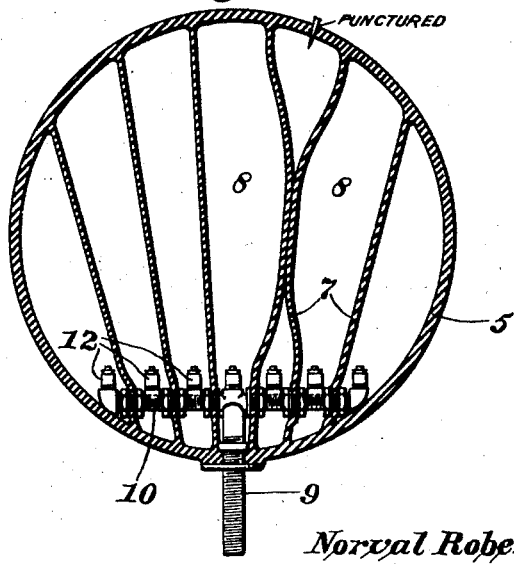

Other objects and advantages reside in the details of construction and operation as more fully hereinafter described and claimed, reference being had to the accompanying drawings forming part hereof, wherein like reference numerals refer to like parts throughout, and in which:

Figure 1 is a transverse sectional view of an inner tube showing the inflating valve for the several compartments, Figure 2 is a similar view showing the position of the partitions when one of the compartments is deflated, Figure 3 is an enlarged vertical sectional view of the inflating valve for the several compartments, Figure 4 is a sectional view taken substantially on a line 4—4 of Figure 3, and Figure 5 is a sectional view of a modified valve construction for use upon drop-center wheels.

Referring now to the drawings in detail, and first with respect to the form of invention illustrated in Figures 1 to 4, inclusive, the numeral 5 designates an inner tube for mounting in a tire casing 6, the inner tube being provided with a plurality of circumferentially extending, flexible rubber partitions 7 separating the inner tube into a plurality of circumferentially extending air chambers 8.

In order that the several air chambers may be uniformly inflated, I provide a valve casing 9 projecting upwardly through the inner tube 5 into one of the center compartments 8, the inner end of the casing 9 communicating with a transversely extending air manifold pipe 10 which projects through each of the partitions 7 to position a portion of the pipe 10 in each of the air compartments, as indicated in Figure 3 of the drawing.

The pipe 10 is closed at each end and the pipe is externally threaded to receive nuts 11 positioned at opposite sides of the respective partitions 7 to provide an air seal around the pipe and to prevent the escape of air from one compartment into an adjacent compartment.

A plurality of valve housings 12 of tubular construction project laterally from the pipe 10 into the respective air compartments 8, the outer end of each housing 12 constituting a valve seat engaged by a conical air discharge valve 13, the valve including a stem 14 slidably mounted in a guide 15 secured in the housing and against which one end of a coil spring 16 is positioned and with its other end connected to the valve stem to exert its influence on the valve for closing the same.

The valves 13 for the respective air chambers are responsive to air pressure entering the valve casing 9 and pipe 10 to open the valves to admit air into the chambers.

A rod 17 extends longitudinally in the pipe 10 substantially throughout the length thereof for engagement with the inner ends of each of the valve stems 14, the rod having one end of a valve stem 18 threadedly connected thereto and extending longitudinally in the valve casing 9.

The valve casing 9 is formed, on its inside, with a valve seat 19, against which a conical valve 20 is engaged and to which the valve stem 18 is secured.

The valve stem 18 is slidably mounted in a guide 21 secured in the valve casing 9 and against which one end of a coil spring 22 is engaged and with its other end engaging the valve 20 to yieldably close the latter.

In the operation of the device, the springs 16 normally close the valves 13 for the respective air compartments 8, while the spring 22 normally closes the valve 20 in the valve casing 9.

Upon attaching a conventional form of air chuck to the outer end of the valve casing 9, the valve stem 18 is moved inwardly, which in turn moves the rod 17 against the inner ends of the valve stems 14 to also open the valve 13 and air is admitted into the respective air compartments 8. Upon removing the air chuck from the valve casing 9, the valves are closed by their respective springs. The several air chambers are thus simultaneously and uniformly inflated and should the tire be over-inflated, the valve stem 18 is moved inwardly by a suitable instrument, which thereby opens all of the valves to simultaneously reduce the air pressure in the several chambers.

In the form of the invention illustrated in Figure 5 of the drawing, the valve casing 23 extends angularly from the transverse pipe 24 toward one side of the tire to adapt the device for use on drop-center wheels.

In view of the foregoing description taken in conjunction with the accompanying drawings, it is believed that a clear understanding of the construction, operation and advantages of the device will be quite apparent to those skilled in this art. A more detailed description is accordingly deemed unnecessary.

It is to be understood, however, that even though I have herein shown and described a preferred embodiment of my invention that the same is susceptible to certain changes fully comprehended by the spirit of the invention as herein described and the scope of the appended claims.

Having thus described the invention, what I claim is:

1. An inner tube for pneumatic tires having a plurality of circumferentially extending, spaced apart partitions forming a plurality of circumferential air chambers in the tube, an air manifold discharge pipe extending transversely of the chambers through said partitions, an air discharge valve in each chamber for controlling the discharge of air from said pipe, a valve casing for inflating the tube and communicating with the pipe, a valve in the casing, a rod extending longitudinally in said pipe in operative engagement with each of the valves in said chambers, and a valve stem in said valve casing and connected to said rod and the second named valve for opening said first-named valves by an opening movement of the second valve.

2. An inner tube for pneumatic tires having a plurality of circumferentially extending, spaced apart partitions forming a plurality of circumferential air chambers in the tube, an air manifold discharge pipe extending transversely of the chambers through said partitions, a valve housing in each chamber connected to the pipe, a valve in each housing and including a valve stem projecting into the pipe, a rod extending longitudinally in the pipe, and a valve casing connected to said pipe and having a valve therein for inflating the tube, said last-named valve being connected to the rod for moving the rod into engagement with the stems of the first valves to open the latter upon an opening movement of the second valve.

NORVAL ROBERT MADDOX.

REFERENCES CITED

The following references are of record in the file of this patent:

UNITED STATES PATENTS

| Number | Name | Date |
|---|---|---|
| 2,039,343 | Procul | May 5, 1936 |
| 2,223,007 | Legowsky | Nov. 26, 1940 |